(12) United States Patent
Auciello et al.

(10) Patent No.: US 8,834,757 B2
(45) Date of Patent: Sep. 16, 2014

(54) METHOD FOR MAKING PARTICLE/POLYMER COMPOSITES AND APPLICATIONS

(75) Inventors: Orlando H. Auciello, Bolingbrook, IL (US); Pablo Gurman, Woodridge, IL (US); Alejandro Berra, Buenos Aires (AR)

(73) Assignee: UChicago Argonne, LLC, Chicago, IL (US)

(*) Notice: Subject to any disclaimer, the term of this patent is extended or adjusted under 35 U.S.C. 154(b) by 433 days.

(21) Appl. No.: 13/250,527

(22) Filed: Sep. 30, 2011

(65) Prior Publication Data

US 2013/0084420 A1 Apr. 4, 2013

(51) Int. Cl.
| | |
|---|---|
| *B32B 3/02* | (2006.01) |
| *C08K 3/04* | (2006.01) |
| *C04B 35/64* | (2006.01) |
| *B32B 27/06* | (2006.01) |

(52) U.S. Cl.
CPC . *B32B 3/02* (2013.01); *C04B 35/64* (2013.01); *C08K 3/04* (2013.01); *B32B 27/06* (2013.01)
USPC .......................................................... 264/109

(58) Field of Classification Search
None
See application file for complete search history.

(56) References Cited

U.S. PATENT DOCUMENTS

| | | |
|---|---|---|
| 6,168,575 B1 | 1/2001 | Soltanpour |
| 6,589,203 B1 | 7/2003 | Mitrev |
| 6,682,500 B2 | 1/2004 | Soltanpour et al. |
| 7,127,286 B2 | 10/2006 | Mech et al. |
| 2006/0263233 A1* | 11/2006 | Gardinier ........................ 419/11 |
| 2009/0182429 A1* | 7/2009 | Humphreys et al. ....... 623/17.16 |
| 2011/0006218 A1* | 1/2011 | Mochalin et al. .......... 250/459.1 |

FOREIGN PATENT DOCUMENTS

MX    WO99/66871    12/1999

OTHER PUBLICATIONS

B. Byunghoon, et al., Invitro experiment of the pressure regulating valve for a glaucoma implant, J. Micromech. Microeng. 13 (2003), pp. 613-619.
C. Vautier, et al., Nanomedicines: A New Approach for the Treatment of Serious Diseases, J. of Biomedical Nanotechnology, vol. 3, (2007), pp. 1-12.

* cited by examiner

*Primary Examiner* — Mary F Theisen
(74) *Attorney, Agent, or Firm* — Cherskov Flaynik & Gurda, LLC (57) ABSTRACT

The invention provides a method for producing bioinert biocompatible diamond particles/polymer composites or any other matrix (e.g. glass, metal, plastic, ceramic and more)/diamond particle composites, even if not biocompatible with outstanding mechanical, tribological, and biological properties, the method comprising selecting a polymer having a melting temperature below about 300 C; mixing diamond particles with the polymer to form a liquid mixture, poring the liquid diamond particle/polymer or any other diamond particle/matrix composite in liquid form into a mold and then causing the composite to sinter with the diamond particles densely and uniformly distributed through the bulk and surface of the composite, such that the diamond particles distributed on the surface can form a diamond layer covering the surface.

12 Claims, 6 Drawing Sheets

METHOD FOR MAKING PARTICLE/POLYMER COMPOSITES AND APPLICATIONS

CONTRACTUAL ORIGIN OF THE INVENTION

The U.S. Government has rights in this invention pursuant to Contract No. DE-AC02-06CH11357 between the United States Government and UChicago Argonne, LLC, representing Argonne National Laboratory.

BACKGROUND OF THE INVENTION

1. Field of the Invention

The present invention relates to particle/polymer composites and more specifically, the present invention relates to particle/polymer combinations (wherein the particles are diamonds or oxides) and methods for making the composites for use in applications inside or outside the human body.

2. Background for the Invention

There is a continuous search for biocompatible materials suitable for fabrication of soft, flexible components of biomedical devices implantable inside the human body (e.g., artificial joints, such as hips and knees, artificial heart valves, catheters, valves for drainage of saline form the eye to treat the glaucoma condition, breast implants, and more) or located externally to, but in contact with the biological environment of the human body (e.g., soft contact lenses).

BioMEMS Devices for Drainage of Eye Liquid:

Materials currently used to fabricate implantable devices suffer from adhesion of proteins, and therefore the development of fibrosis, which leads to heightened immune response.

Microelectromechanical system (MEMS) valves have been developed to drain liquid from the eye to reduce the abnormal intraocular pressure increase due to the pathological condition known as glaucoma. Glaucoma is a gradual increase, sometimes rapid, in the internal pressure of the liquid in the eye. Glaucoma occurs when natural drainage tubes become clogged due to biological processes. Resulting high pressure leads to destruction of the cells and the optic nerve responsible for signal transmission to the brain for image formation. The increase in the eye's pressure is a high-risk condition that affects about 67 million people in the world resulting in impaired vision up to blindness, if not properly treated.

Currently there are drug and surgical treatments available to lower the intraocular pressure. In cases when the drug or surgery treatment do not work, the alternative is to insert implants in the eye ("shunts"), which feature passive valves to drain the excess liquid that produce over-pressure, via microtubes, as disclosed in Patent No. W099/66871. This patent describes a device about 1 cm long—implantable in the eye to decrease the ocular pressure, via a safety valve that regulates the liquid pressure, once the latter exceeds the value that affects the eye health. However, current implants have problems, as discussed below:

The dimensions of the implants are not small enough and the material cannot avoid fibrosis, due to attachment of proteins to the surface of the device.

Surgery does not optimize the intraocular pressure nor make it predictable, resulting in hipotonia or high resistance to liquid flow.

The intraocular pressure change during the day, and that carination cannot be compensated by passive valves.

The hydrophilic nature of the surface of polymers currently used in MEMS valves leads to protein or cells attachment to the surface, thus immune rejection.

Attempts have been made recently to replace passive valves by active micro-valves actuated chemically or electro-magnetically using MEMS technology. In this respect, Byunghoon *J. Micromech. Microeng* 13 (2003) 613 described an ocular implant to control glaucoma via an electromagnetically actuated membrane moved by magnetic force. The membrane is made of an elastic polymer of low Young's modulus.

Alternatively, U.S. Pat. No. 6,168,575 (Soltanpour et al.) describes a small pump (5-15 mm long) implantable in the eye to remove excess fluid to automatically control the eye pressure. Control is achieved via a pressure sensor connected to a microprocessor and positioned outside the eye. The patent referenced above discusses the disadvantages of automatic adjustment in relation to muscular hipotony.

U.S. Pat. No. 6,589,203 describes a device implantable in the eye, which includes a deformable surface of a material capable of resisting continuous deformation. The device also features a tube, with a valve sensitive to pressure variation, to drain the eye liquid.

U.S. Pat. No. 6,682,500 awarded to Soltanpour et al. describes a device with a diaphragm pump made of a synthetic metal-based polymer. This device has two valves, one in the tube at the entrance to the pump and the other at the exit to regulate the fluid flow.

Unfortunately, all implants described above exhibit biocompatibility and dimension problems, which result in malfunction and liquid flow obstruction. Significant challenges include making surfaces of the polymer based microtube bioinert.

U.S. Pat. No. 7,127,286 discloses a device with electronic circuitry formed on silicon and then uniformly covered with ultra-nanocrystalline diamond (UNCD) for implantation inside the eye, on the retina, to restore sight to people blinded by retina photoreceptor degeneration. However, care must be taken in producing this device as the UNCD film needs to be grown at about 400-450° C. These temperatures often destroy the Si chip during encapsulation, depending on the amount of time needed to grow a hermetic UNCD film. In addition, the UNCD film does not exhibit the high insulation needed to induce leakage currents $\leq 9 \times 10^{-9}$ A/cm$^2$, while the Si microchip is powered inside the eye.

BioMEMS for Drug Delivery:

An intractable problem is the administration of drugs to patients in a safe, efficient way. Typical drug carriers are chemical vehicles, which more recently are combined with nanoparticles such as nanocapsules, nanospheres, and polymer matrices. (Vautier et al. 2007). None of the current drug delivery approaches involve inert components, or active, controllable and predictable systems. This results in uncontrolled, more expensive, and riskier (secondary effects) drug delivery devices due to lack of control over drug release mechanisms.

Recently, several groups have been investigating and developing microchips with integrated microelectromechanical/nanoelectromechanical (MEMS/NEMS) devices for intelligent, efficient, reduced cost and safer drug delivery. Although some prototype devices have been demonstrated for application to pathologies like osteoporosis and delivery of vasopresin for soldiers in the battle field, there are still problems, particularly on biocompatibility of the devices.

Typically, implants invoke the formation of a fibrous capsule and these leads to a response from biological tissue in the form of local inflammation. Extraction of the implanted device usually follows. Implant rejection inhibits the normal function of the device, when for example, fibrosis prevents sensors from having access to analyte. Also, drug-delivery devices encounter a barrier to deliver the drug.

Several approaches have been investigated to reduce or eliminate the fibrous capsule, such as encapsulation with polymers (PEG), surface texturing in the device material, and production of porous membranes to minimize the adhesion of cells.

These approaches have problems, such as lack of active control and adhesion issues of the materials (polymers) due to temperature changes. Use of packaging may be a solution, but it appears costly and also the materials used for packaging exhibit biocompatibility problems themselves, in addition to lacking active control.

In the drug delivery field, microchips control drug delivery. These systems involve MEMS-based reservoirs on a Si wafer, which are covered by a membrane electrically actuated or activated by remote RF communication to release the drugs in the reservoir. All the devices mentioned above are fabricated with materials like Si, which are not biocompatible, or polymers that are partially biocompatible, since after some time of implantation they elicit body reactions as described above.

Artificial Joints:

The joints of the human body generally have two opposing surfaces in movable, repetitive contact with each other, and as such are biological rollers. Prostheses (manmade mechanical rollers) are used to replace these worn out biological rollers. The surfaces of the components of the prosthesis slide one-upon-each other while wetted by naturally occurring synovial fluid. Thus, the combination of the prosthesis motion and the lubricating synovial fluid controls the performance of the joint.

Natural joint surfaces exhibit characteristics that are difficult to reproduce. For example, cartilage regenerates and also has the ability to soften impacts. Currently, the materials used in the fabrication of artificial joints do not exhibit all of the characteristics of natural joints.

There is a search for prosthesis materials (mechanical roller) with very low coefficient of friction (COF) and wear. However, the material currently used for fabrication of prosthesis release particles when they are sliding one-upon-each other, and those particles lead to problems either because eliciting adverse reactions from the human body, due to inferior biocompatible character of the particles organism or because they generate undesirable ions.

Research and development of prosthesis materials have focused on four material pairs, all of which have advantages and disadvantages, namely: 1) Metal/Polyethylene, 2) Metal/Metal, 3) Ceramic/Ceramic and Metal/Ceramic. Ceramic/Ceramic exhibits the lowest wear. However, because ceramic materials are brittle, they risk fracture.

Metal/metal pairs exhibit low wear, but their use results in the production of metal ions. These particles, emitted from the worn metal surfaces are small and numerous.

Metal/Polyethylene pairs exhibit the highest wear, compared to the other two pairs, thus the prosthesis fabricated with this pair have a short lifetime. Neutron and electron irradiation of metal and polyethylene couples increase their resistance to wear, but at the cost of becoming more fragile.

Metal/Ceramic pairs exhibit superior properties to Metal/Metal pair in terms of friction and wear rates. Metal/ceramic configurations also exhibit comparable properties to the three other candidates in terms of range of motion (ROM). This prosthesis pair provides acceptable lifetimes when implanted in people of relatively advanced age, does not provide acceptable lifetimes when implanted in younger people.

A September 2011 report from the National Joint Registry for England and Wales, revealed that failure rates of metal-on-metal hips, such as the DePuy ASR and certain Pinnacle devices are increasing. Generally research has focused on developing materials with low coefficient of friction and low wear rates for prostheses. Low COF and wear-rate coatings also are being explored, as hard materials exhibit less wear than soft materials. Materials such as titanium nitride and carbons have been investigated as coatings. However, these materials have problems of adhesion, resulting in delamination from the base material of the prosthesis.

It is generally known that hips are the most replaced joints, and that research on new materials for hips is leading the effort on the development of prosthesis. However, replacement of knees is becoming also a frequent event, and currently knee replacements are reaching numbers similar to those of hips. Knees are subject to more stringent motions and thus exhibit shorter lifetimes than the hips.

Figure 1:
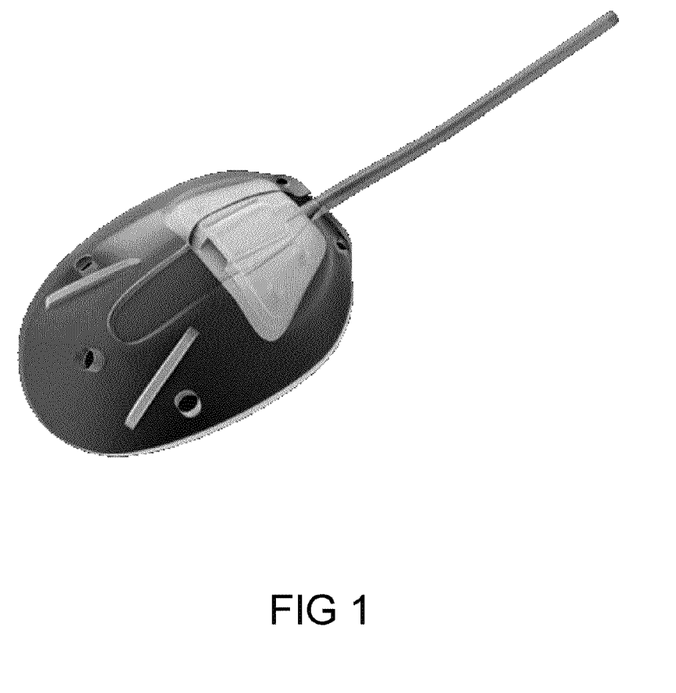
FIG. 1 is a photograph of a liquid valve for insertion into the eyes of glaucoma patients to release internal eye pressure.
Figure 2:
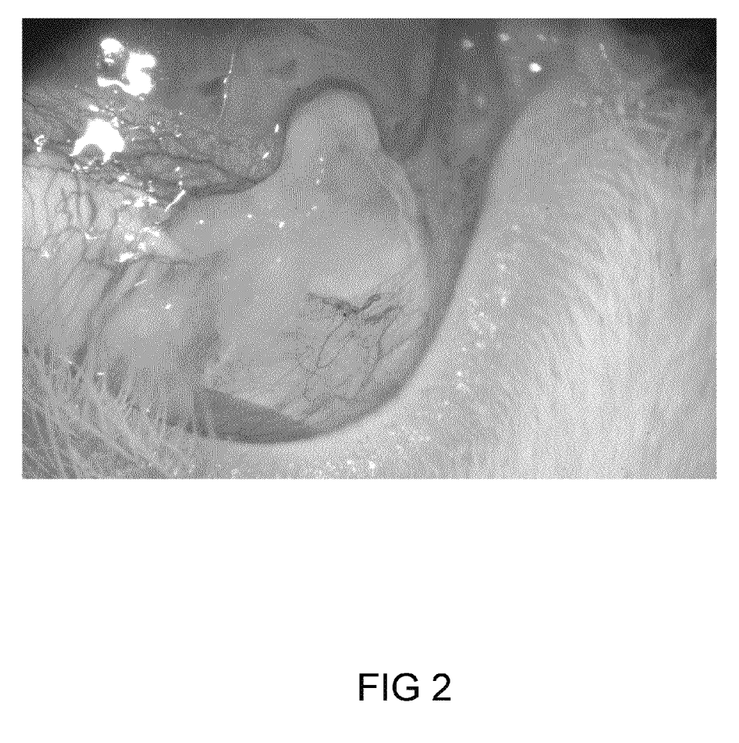
FIG. 2 is photograph of the value depicted in FIG. 1, but encapsulated by proteins, which produced the fibrosis seen in the photograph.

Polymer-Based Implants:

A myriad of attempts have been made to incorporate polymers into implant devices. FIG. 1 is a picture of a valve for implantation in the eye to minimize pressure associated with glaucoma. However, protein adhesion to polymers exacerbates the body's rejection of such systems. FIG. 2 is a photograph of the device depicted in FIG. 1, but with protein adhesion on the surface (fibrosis), Coating of the silicone glaucoma valve with a UNCD layer eliminates the protein attachment (fibrosis) FIG. 4. shows the absence of such adhesions.

Figure 4:
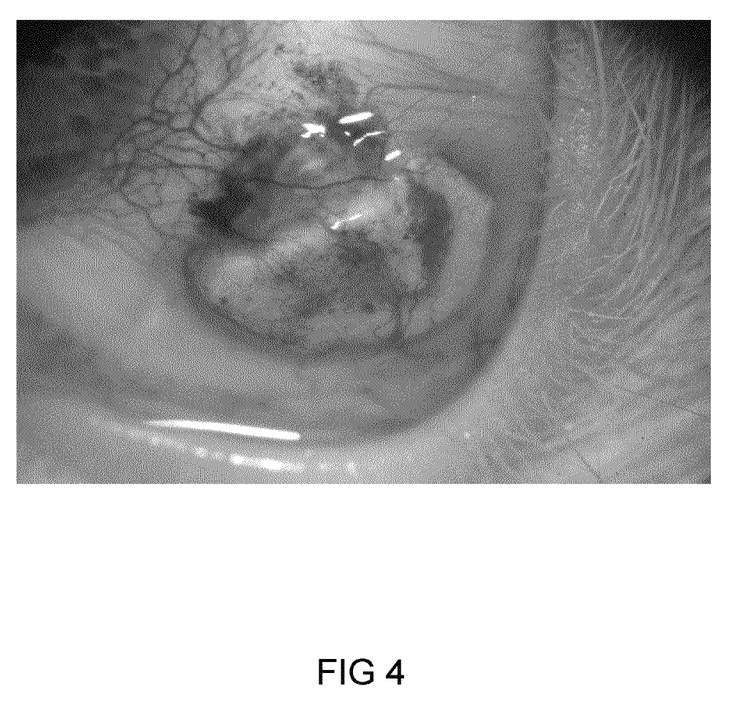
FIG. 4 is a photograph of an implanted silicone-based glaucoma valve body coated with UNCD, in accordance with features of the present invention.

FIG. 4 is a photograph of a silicone-based glaucoma valve body, which was coated with a UNCD film prior to implantation into a rabbit eye. The device is shown in pristine condition, even after five months of implantation. No evidence of fibrosis is found on this UNCD-coated polymer construct.

Another example of a device based on a polymer platform, this one located externally to, but in contact with the biological environment of the human body, is a soft contact lens. Such lenses exhibit the problem of protein adhesion to the surface, which reduces the lifetime of the lens, and requires frequent cleaning.

Silicone elastomers (a particular kind of polymer) have been widely used for coating cardiac pacemakers, as platform material for implantable catheters and mammary prostheses. The use of silicone has been particularly extensive in the fabrication of mammary prostheses. However, despite the relative inertness of silicone elastomers, they still elicit inflammatory or reign body reaction in many patients to different degrees. This reaction is induced when a foreign body enters into the human tissue, which responds by surrounding the foreign substance with a sheath of fibrous tissues to render the foreign substance harmless. However, the fibrosis induced by the non-very biological material results in scar-type tissue. The fibrous capsule formed around the implant can contract and becomes hard and rigid, resulting in substantial discomfort, and ultimately in failure of the implant.

Encapsulating the polymer with a bioinert film is a possible solution to solve the aforementioned protein adhesion problems. However, often the coating process results in an unwanted hardening of the polymer. For example, using a UNCD film to cover the surface of the polymer requires that the construct be heated to 400-450° C. This results in hardening (loss of the natural flexibility) of the polymer.

In addition, coating of the polymer surface with a UNCD layer requires a time consuming seeding process, embedding nanodiamond particles on the surface by exposure of the polymer to a ultrasonic bath featuring a solution of nanodiamond particles in a solvent like methanol, followed by several hours of growth of the UNCD layer in a microwave plasma chemical vapor deposition (MPCVD) system featuring an Ar/CH$_4$ gas mixture-based plasma.

There is a need in the art for a process for producing substrates having reduced coefficients of friction and improved strength. The process should be compatible with existing manufacturing processes. The resulting substrates should be biocompatible and less susceptible to attack by immune systems and chemical moieties generally.

SUMMARY OF INVENTION

An object of the invention is to provide a process for producing polymer/particle composites that overcomes many of the disadvantages of state of the art plain polymer materials.

Another object of the invention is to provide a method for producing biocompatible materials. A feature of the method is that it can be performed at below about 400 C. An advantage of the invention is its easy integration into existing processes for polymer production. This results in economical process for conferring increased surface resistance to chemical, mechanical and biological-induced degradation, as well as instilling bioinert qualities. The process also has the advantage of being easily applied to glass, plastic and metal production methods to yield stronger glasses, diamond particles/plastic composites, diamond particle/metal composite and other composite materials.

Still another object of the present invention is to provide a biocompatible material. A feature of the invention is the embedment of diamond and/or glass particles into a polymer during manufacture of parts comprising the composite. An advantage of the invention is that bioinert and/or extremely slick (i.e., a friction coefficient of less than or equal to 0.07) articles can be manufactured without disruption of already established manufacturing processes.

Still another object of the invention is to combine the insertion of the diamond particles with particles with high index of refraction into contact lenses, so the diamond particles on the surface help to reduce by orders of magnitude the chemical degradation due to protein adhesion to the surface of the polymer, and the high index of refraction particles help to increase the index of refraction of the lens to improve by orders of magnitude the power of the lens.

Yet another object of the present invention is to provide bioinert/biocompatible materials which can be fabricated into any shape or size, including the size ranges (less than 50 mm in some instances) for implantation in the human body. A feature of the material is the incorporation of its encapsulation with UNCD, NCD and/or MCD particles in the bulk and/or the surface of the material. An advantage of the resulting composite is that the inclusion of the particles does not alter the volume of the material such that the material remains compact enough to be incorporated in tiny implantable devices. Another advantage is that the material can be manufactured at temperatures used for curing the polymer less than 300° C.

Briefly, the invention provides a method for producing diamond particle-containing composites, the method comprising selecting a polymer having a viscosity of between 100 Pascal seconds (Pa-s) to 600 Pa-s; mixing particles with the polymer to form a liquid mixture; inserting the liquid mixture into a mold, and curing the mixture at a temperature in the range of between about 100 to 300 C to produce a homogeneous solid particle/polymer composite.

Also provided is a method for inserting UNCD, NCD and/or MCD particles in a polymer matrix, both in the bulk and on the surface of the part once taken from a mold, the method comprising mixing an appropriate amount of diamond particle weighted in a balance with the liquid polymer and stirring to achieve uniform distribution of the particles in the polymer, followed by insertion into the mold for curing to produce the desired part.

The invention also provides a bioinert/biocompatible polymer with embedded UNCD, NCD, and/or MCD particles throughout the bulk and on the surface.

BRIEF DESCRIPTION OF DRAWING

The invention together with the above and other objects and advantages will be best understood from the following detailed description of the preferred embodiment of the invention shown in the accompanying drawings, wherein.

DETAILED DESCRIPTION OF THE INVENTION

The foregoing summary, as well as the following detailed description of certain embodiments of the present invention, will be better understood when read in conjunction with the appended pictures and drawings.

As used herein, an element or step recited in the singular and preceded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

This invention provides materials and methods for making materials which have strong resistance to chemical degradation induced by body fluids or interaction with the cellular environment of the human body (e.g. adhesion of proteins to the surface of biomedical implants). These materials also have strong resistance to wear and low friction coefficient for applications such as opposing surfaces in artificial joints.

This invention also solves the aforementioned protein adhesion problems associated with polymer-based systems. Specifically, the invention enables polymer-based systems embedded micro and/or nanoparticles of diamond and or oxides. Experiments by the inventors show that a silicone body of a glaucoma valve coated with a layer of UNCD particles does not elicit protein adhesion. Therefore fibrosis does not develop, even after many months of implantation in rabbit eye.

Aside from homogenously mixing microcrystalline diamond (MCD), nanocrystalline diamond (NCD) and/or ultrananocrystalline diamond (UNCD) in the bulk of the polymer, the invention also enables covering the surfaces of polymers with a high density of diamond particles so as to substantially encapsulate the polymers. The method produces the coatings at temperatures below the decomposition temperatures of the polymers. In an embodiment of the invention, the method produced polymers parts with a dense concentration of diamond particles on the surface at temperatures less than or equal to about 300° C.

In addition, the mixing of the diamond particles with the high index of refraction particles help to increase the index of refraction of contact lens to improve by orders of magnitude the power of the lens. Specifically, inclusion of diamond in polymers utilized for contact lens manufacture results in composite lenses with higher indices of refraction compared to neat polymers and state of the art resin constructs.

The invented diamond particle/polymer composites exhibit a combination of high hardness, low coefficient of friction (COF), low wear, high index of refraction, and/or bioinertness/biocompatibility for application to a broad range of technologies, for example: 1) bio-inert/biocompatible polymer-based glaucoma valves for draining liquid from the eye to avoid overpressure (glaucoma condition) in people's eyes, where the natural draining does not work, thus impairing vision and sometimes leading to blindness; and 2) diamond particles embedded on the surface of contact lenses to increase the resistance to attachment of proteins, which otherwise degrade the lifetime of the lens.

The diamond particle/polymer composites can be fabricated using the processes currently used in the various industries indicated above, by inserting the particles in the process using a controlled percentage protocol so as to achieve the required properties. Other materials that can be used as the matrix to sustain the composite with embedded diamond particles are glass, plastics, metals, and ceramics, and combinations of these matrices.

The invention provides reliable bio-inert/biocompatible coatings for use in the fabrication of implantable biomedical devices inside or outside the human body. The coatings do not alter the volume of the device, which therefore make it easier to implant. This was confirmed by the recent proof-of-principle experiment involving the production of a UNCD particle/contact lens polymer composite, which was used to fabricate a contact lens subsequently implanted in rabbit eye. Months of implantation revealed that the UNCD particle/polymer composite lens remained pristine without any evidence of fibrosis. (See FIG. 5).

The inventors envision their process to produce UNCD films with a coefficient of friction of less than 0.07 and typically 0.02 to 0.04. Thus, the coatings can be utilized as coatings for the metal alloy part of a prosthesis. Furthermore, UNCD particles embedded in polymer enables production of an opposing surface component having low friction coefficient. This combination results in a long lasting prosthetic device. Generally, substrates containing the diamond particles exhibit high mechanical strength, excellent dimensional stability, low friction coefficient ($\leq 0.07$) natural lubricity, fatigue endurance, high resistance to repeated impacts, excellent resistance to moisture and many other chemicals and fluids, good electrical insulating characteristics, extremely low wear (compared with simple polymers without the embedded diamond particles on the surface) and high toughness.

Figure 3:
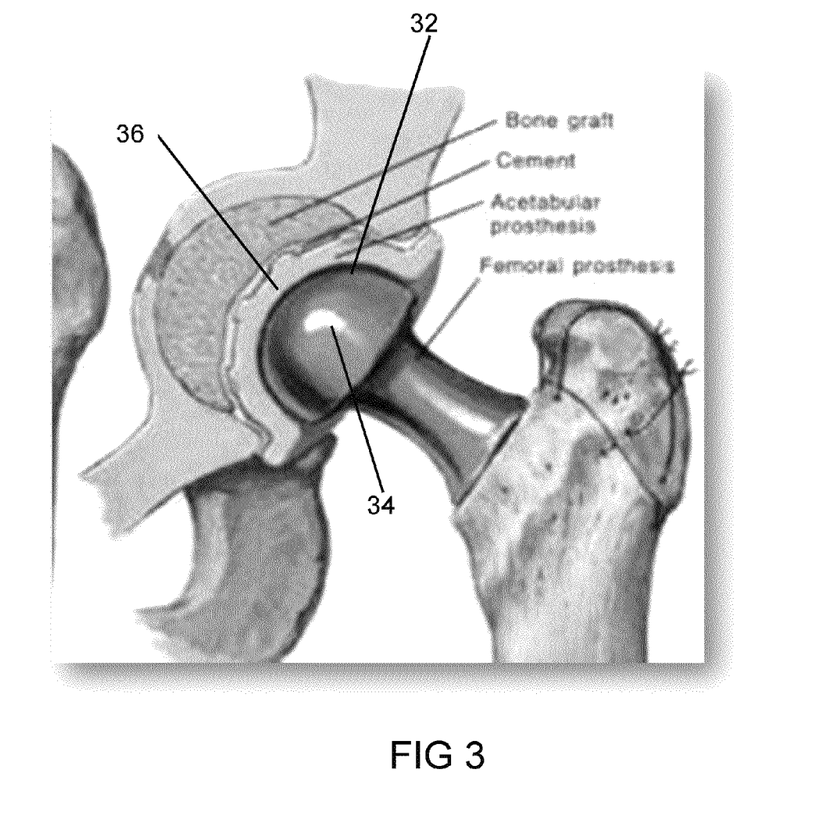
FIG. 3 is a schematic of the invented material incorporated in a hip prosthesis, in accordance with features of the present invention.

FIG. 3 is a schematic depiction of a joint prosthesis utilizing the invented material. The invented polymer-UNCD composite defines a coating for a metallic hip. Specifically, the invented substrate defines a coating 32 overlaying the ball portion 34 of the ball and socket joint. Opposing the coating 32 is a standard polymer counterface 36

The invention also provides a process that can be integrated as much as possible into the process currently used for fabrication of bottles. The insertion of diamond particles into the mixture used to produce the glass results in diamond particles residing in the glass bulk, thus providing the increase in the strength of the glass. Diamond particles on the surface of the glass provide low coefficient of friction and resistance to chemical attack of the glass.

In an embodiment of the invention, MCD, NCD, and/or UNCD particles reside on the surface of a polymer, wherein the polymer is not compatible to temperatures above 300° C. However, the invented process is also compatible with polymers having melt temperatures above 300° C.

The weight percentage of the particles to the polymers can be varied in a wide range from 5-80%. The density could be adjusted, as desired, by adding more or less amount of particles in the polymer matrix. Diamond particle sizes include ultrananocrystalline diamond (UNCD) (2-5 nm in diameter), nanocrystalline diamond (10-100 nm in diameter), and microcrystalline diamond ($\geq 1$ micrometer in diameter). The diamond particles acquired from the manufacturer are in a powder form contained in glass or plastic containers.

Suitable polymers for fabrication of the diamond particle/polymer composites include silicone, and those polymers that fit in the category of thermoplastics including polyethylene, polypropylene and polyvinyl, although other polymers are not excluded for use to make the composites.

Fabrication Detail

Figure 6:
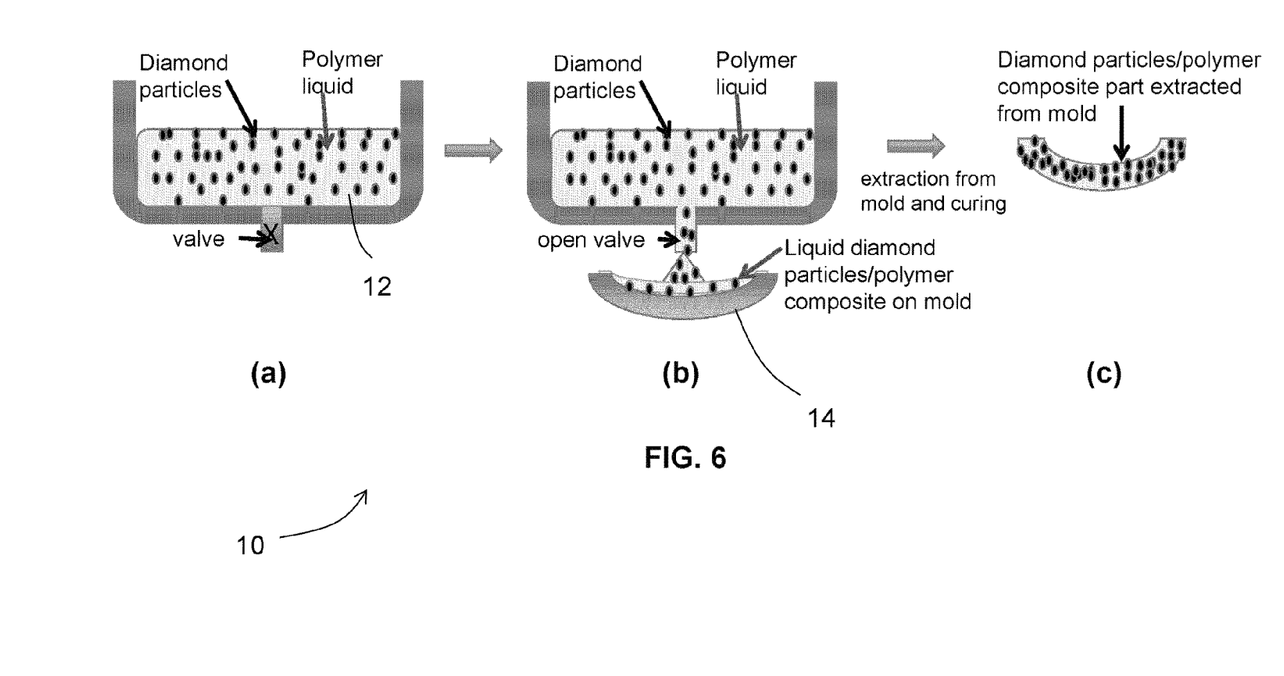
FIG. 6 is a schematic diagram of a process for preparing particle/polymer composites, in accordance with features of the present invention.

FIG. 6 is a schematic diagram of a process for producing diamond/polymer composites. The process is designated as numeral 10. FIG. 6A depicts the beginning of the process wherein particles and polymer are placed into a mixer to create a homogenous liquid mixture 12. The surface of commercial diamond particles is coated with patented molecules that inhibit agglomeration, thus inhibiting condensation of the particles at the bottom of the container. In addition, the liquid mixture of diamond particles with the polymer is exposed for several minutes ($\geq 30$ minutes) to an ultrasonic mixer to assure homogeneity.

Upon establishing an homogeneous mixture, the mixture is dispensed to a mold 14. This step is depicted in FIG. 6B. This dispensing can be done at ambient temperatures or whatever temperature typically is used for mold-casting procedures of the neat polymer.

Upon casting into the mold, the composite is cured by exposure to heat, or other forms of radiation, such as UV light, microwave radiation, lasers, or pressure. Preferably, to keep the process economical, and within the foot print of typical fabrication processes, a simple application of heat is utilized.

FIG. 6C depicts the final product removed from the mold. The finished product can then be used directly, or else further processed via polishing, etching, or other processes.

The resulting bioinert/biocompatible part is defined by a rigid diamond/polymer matrix and a dense distribution of diamond particles on the surface of the polymer matrix, substantially encapsulating the matrix. In an embodiment of the invented material, the matrix has a thickness of $\geq 10$ nm. Also in an embodiment of the invented material, the layer of diamond particles on the surface of the polymer has a thickness of $\geq 10$ nm. The composite can exhibit hardness of from at least 15 Kg f/mm$^2$, and up to hardnesses approximating diamond in instances where very high density coverage of the polymer surface with diamond particles occurs.

In an embodiment of the invented process, the composite is produced first in the liquid state by mixing weighted amounts of diamond particles and the polymer matrix in liquid state via stirring in an ultrasonic bath. Once the mixed composite has been achieved with uniform density, as observed by optical means, the liquid composite is poured into the mold and heated to curing temperature for a period of time (for example, 30-60 minutes) determined by the polymer manufacturer. Subsequently, the part made with composite with the uniform distribution of diamond particles from the bulk to the surface is extracted from the mold for characterization and use.

The mixture is then poured into a mold and heated to produce a pre-sintered composite substrate.

The composite substrate is then cured into molded shapes at temperatures ranging from about 100 to 300 C. If the density of the diamond particles embedded in the polymer matrix is high enough (for example above approximately 80 NP/ml, then the distribution of particles on the surface of the composite can be as dense as to produce a coating-like cover. This migration of particles to the surface is the result of surface tension which develops during the heating process.

The heating step can be conducted in air or under controlled flow of gases, such gases including nitrogen, oxygen, inert (i.e. noble) gas, or a combination of these gases.

Figure 5:
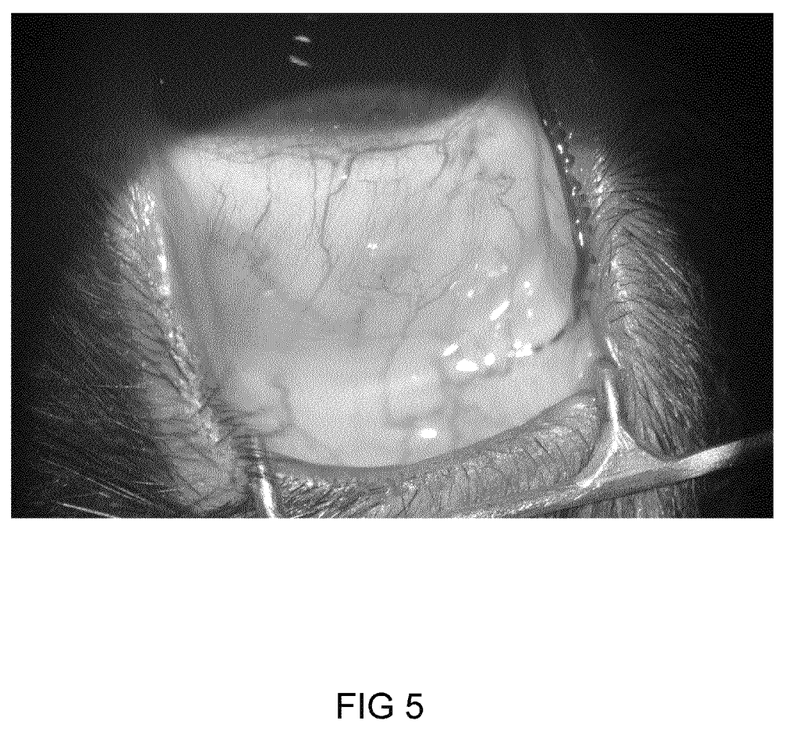
FIG. 5 is a photograph of a contact lens comprising particle/polymer composite material, in accordance with features of the present invention.

Recent proof-of-principle work performed by the inventors, demonstrated that UNCD particles can be mixed with the raw polymer used to fabricate soft contact lenses, resulting in the insertion of the UNCD particles both in the bulk and on the surface of the lens. The UNCD-particle/contact lens polymer composite was inserted into a mold used to produce contact lenses, and lenses were fabricated and subsequently implanted in rabbit eyes. FIG. 5 shows UNCD-particle/polymer composite contact lenses after implantation for months in rabbit eyes, exhibiting a pristine condition without evidence of fibrosis.

The UNCD particles inserted in the polymer matrix of the lens may contribute to increase the index of refraction, due to their high index of refraction (n=2.42) either by themselves or in combination with embedded oxide particles [for example $TiO_2$, another material with good biocompatibility could be a great candidate for helping to increase the index of refraction, considering that its index of refraction is one of the highest among all materials and the highest among biocompatible materials (n=2.50)]. However, other materials could be considered for insertion into the lens to increase the index of refraction (e.g, Si nanoparticles or coatings because $n_{Si}$=3.96)

Based on the information presented above, the new diamond particle-embedded composite solve the problems described above because the diamond particles dispersed in the bulk and surface of the polymer provide a polymer surface protected by the diamond's extreme biocompatibility, already demonstrated by the UNCD-coated silicone body of a glaucoma valve (see FIG. 4).

Although the proof-of-principle experiments described herein in relation to the diamond particle/polymer composite have been performed using UNCD particles with 2-5 nm in diameter, the concept can be extended to producing diamond particle/polymer composite using nanocrystalline diamond (NCD) particles with 10-100 nm in diameter or microcrystalline diamond (MCD) particles with ≥1 micrometer in diameter.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The present methods can involve any or all of the steps or conditions discussed above in various combinations, as desired. Accordingly, it will be readily apparent to the skilled artisan that in some of the disclosed methods certain steps can be deleted or additional steps performed without affecting the viability of the methods.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, and other fractions. As a non-limiting example, each range discussed herein can be readily broken down into a lower third, middle third and upper third, and other fractions. As will also be understood by one skilled in the art all language such as "up to," "at least," "greater than," "less than," "more than" and the like include the number recited and refer to ranges which can be subsequently broken down into subranges as discussed above. In the same manner, all ratios disclosed herein also include all subratios falling within the broader ratio.

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

The embodiment of the invention in which an exclusive property or privilege is claimed is defined as follows:

1. A method for producing biocompatible composites, the method comprising:
   a. selecting a polymer having a melting temperature below about 300° C.;
   b. mixing particles with the polymer to form a mixture;
   c. placing the mixture into a mold; and
   d. curing the mixture for a time sufficient to produce uniform distribution of the particles from the interior to the surface of the mixture while setting the final shape of the composite.

2. The method as recited in claim 1 wherein the step of curing the mixture comprises heating the mixture to between about 100° C. and 300° C.

3. The method as recited in claim 1 wherein the polymer is an organic compound selected from the group consisting of silicone, thermoplastics, and combinations thereof.

4. The method as recited in claim 1 wherein the particles are inorganic materials selected from the group consisting of diamond, Si, $TiO_2$ and combinations thereof.

5. The method as recited in claim 1 wherein the particles are homogeneously dispersed throughout the polymer.

6. The method as recited in claim 1 wherein some of the particles reside on the surface of the composites.

7. The method as recited in claim 1 wherein the particles are between 2.5 nanometers and 1 micron in diameter.

8. The method as recited in claim 1 wherein the curing step induces surface tension within the mixture to cause particles to reside uniformly throughout the mixture and on the surface of the mixture.

9. The method as recited in claim 7 wherein the particles are diamonds selected from the group consisting of comprise microcrystalline diamond, nanocrystalline diamond, ultrananocrystalline diamond and combinations thereof.

10. A method for producing a biocompatible composite, the method comprising:
 a. selecting a polymer having a melting temperature below about 300° C.;
 b. mixing particles with the polymer to form a mixture wherein the density of the particles is above approximately 80 particles per milliliter;
 c. placing the mixture into a mold; and
 d. curing the mixture for a time sufficient to produce a uniform distribution of the particles on the surface of the composite while setting the final shape of the composite.

11. The method as recited in claim 10 wherein the particles reside on the surface of the composite at a thickness equal or greater than 10 nm.

12. The method as recited in claim 10 wherein the particles are selected from the group consisting of microcrystalline diamond, nanocrystalline diamond, ultrananocrystalline diamond, and combinations thereof.

* * * * *